United States Patent
Butler et al.

(10) Patent No.: US 10,855,697 B2
(45) Date of Patent: Dec. 1, 2020

(54) THREAT INTELLIGENCE SYSTEM

(71) Applicant: PAYPAL, INC., San Jose, CA (US)

(72) Inventors: Blake Butler, Scottsdale, AZ (US); Bradley Wardman, Scottsdale, AZ (US); Nate Robert Pratt, San Jose, CA (US); Jakub Burgis, San Jose, CA (US); Kevin Tyers, San Jose, CA (US); Nicole Harris, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 330 days.

(21) Appl. No.: 15/640,031

(22) Filed: Jun. 30, 2017

(65) Prior Publication Data

US 2019/0007425 A1 Jan. 3, 2019

(51) Int. Cl.

| H04L 29/06 | (2006.01) |
| G06K 9/46 | (2006.01) |
| G06K 9/62 | (2006.01) |
| G06K 9/00 | (2006.01) |
| G06F 16/33 | (2019.01) |

(52) U.S. Cl.
CPC ...... H04L 63/1416 (2013.01); G06K 9/00456 (2013.01); G06K 9/46 (2013.01); G06K 9/4604 (2013.01); G06K 9/6201 (2013.01); H04L 63/1441 (2013.01); G06F 16/3344 (2019.01); G06K 2209/01 (2013.01); H04L 63/1458 (2013.01); H04L 2463/144 (2013.01)

(58) Field of Classification Search
CPC ...... G06F 21/554; G06F 21/566; G06F 21/32; G06F 21/564; G06F 21/56; G06F 21/64; G06F 21/577; H04L 63/20; H04L 63/145; H04L 63/105; H04L 63/1416; H04L 63/10; H04L 63/1408; H04L 63/1483; H04L 63/102; H04L 63/14
See application file for complete search history.

(56) References Cited

U.S. PATENT DOCUMENTS

| 8,381,292 | B1 * | 2/2013 | Warner | ............... | H04L 51/12 705/50 |
| 8,495,735 | B1 * | 7/2013 | Warner | ............... | H04L 51/12 705/50 |
| 8,555,391 | B1 * | 10/2013 | Demir | ............... | H04L 67/20 713/187 |
| 9,197,663 | B1 * | 11/2015 | Gilbert | ............... | G06F 3/04817 |
| 9,332,031 | B1 * | 5/2016 | Kappiah | ............... | G06F 17/40 |

(Continued)

*Primary Examiner* — Tae K Kim
(74) *Attorney, Agent, or Firm* — Haynes and Boone, LLP

(57) ABSTRACT

Systems and methods for providing a threat intelligence system include a system provider device that downloads, through communication over a network and from one or more targeted websites, a plurality of images of a first environment. Based on an OCR process, the system provider device may extract a set of textual data corresponding to a subset of images of the plurality of images, where the subset of images depict text. The system provider device stores the set of textual data in an indexed and searchable database. The system provider device assigns a threat assessment score to each image based on the set of textual data, and the threat assessment score may be updated based on comparison of the set of textual data with other sets of textual data. Based on the threat assessment score being greater than a threshold value, the system provider device may generate a security alert.

20 Claims, 10 Drawing Sheets

(56) References Cited

U.S. PATENT DOCUMENTS

| | | | |
|---|---|---|---|
| 9,621,566 B2* | 4/2017 | Gupta | H04L 63/1408 |
| 9,792,434 B1* | 10/2017 | Li | G06F 21/554 |
| 9,940,482 B1* | 4/2018 | Nichols | G06F 21/6263 |
| 2006/0168659 A1* | 7/2006 | Saitoh | G06F 21/6245 |
| | | | 726/22 |
| 2007/0094500 A1* | 4/2007 | Shannon | H04L 63/1441 |
| | | | 713/170 |
| 2008/0046738 A1* | 2/2008 | Galloway | H04L 63/1416 |
| | | | 713/176 |
| 2008/0175266 A1* | 7/2008 | Alperovitch | G06F 21/554 |
| | | | 370/465 |
| 2012/0159620 A1* | 6/2012 | Seifert | H04L 63/1416 |
| | | | 726/22 |
| 2014/0270528 A1* | 9/2014 | Ramos | G06T 5/001 |
| | | | 382/182 |
| 2014/0283055 A1* | 9/2014 | Zahran | G06F 21/55 |
| | | | 726/23 |
| 2016/0134649 A1* | 5/2016 | Allen | G06F 40/30 |
| | | | 726/23 |
| 2017/0039652 A1* | 2/2017 | Sandre | H04L 63/102 |
| 2018/0032748 A1* | 2/2018 | Rueger | G06F 21/6218 |

* cited by examiner

THREAT INTELLIGENCE SYSTEM

BACKGROUND

The present disclosure generally relates to a threat intelligence system, and more particularly to a threat intelligence system which provides a framework for harvesting threat intelligence data.

More and more consumers are purchasing items and services over electronic networks such as, for example, the Internet. Consumers routinely purchase products and services from merchants and individuals alike. The transactions may take place directly between a conventional or online merchant or retailer and the consumer, and payment is typically made by entering credit card or other financial information. Transactions may also take place with the aid of an online or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one reason why online and mobile purchases are growing very quickly.

For payment service providers, and for online merchants and consumers in general, computer security is a critical issue as malicious computer intrusions continue to be pervasive. As merely one example, such intrusions may include the distribution of malicious software (i.e., "malware") to compromise computers, smartphones, or other internet-connected devices, where the malware may set up each compromised device as a "bot". A network of compromised devices, or bots, will together form a "botnet". The controller of the botnet is then able to direct the activities of the compromised devices. For example, the botnet controller may use the botnet to perform a distributed denial-of-service (DDoS) attack, to send spam email, to steal data, or to perform other malicious activities. In various cases, the target of such malicious activities may include consumers, enterprises (e.g., including online merchants and payment service providers), governments, or other internet-connected targets. The security risks posed by such malicious activities can be quite extensive and may include loss of time, money, productivity, as well as theft of personal information, payment information, or other sensitive information. Thus, it would be desirable to quickly and accurately identify indicators of compromise (IOC), for example, to reduce the impact of, or to prevent, such a malicious attack and to track down the party responsible for the malicious activity.

Thus, there is a need for a threat intelligence system which provides a framework for harvesting threat intelligence data.

Figure 1:
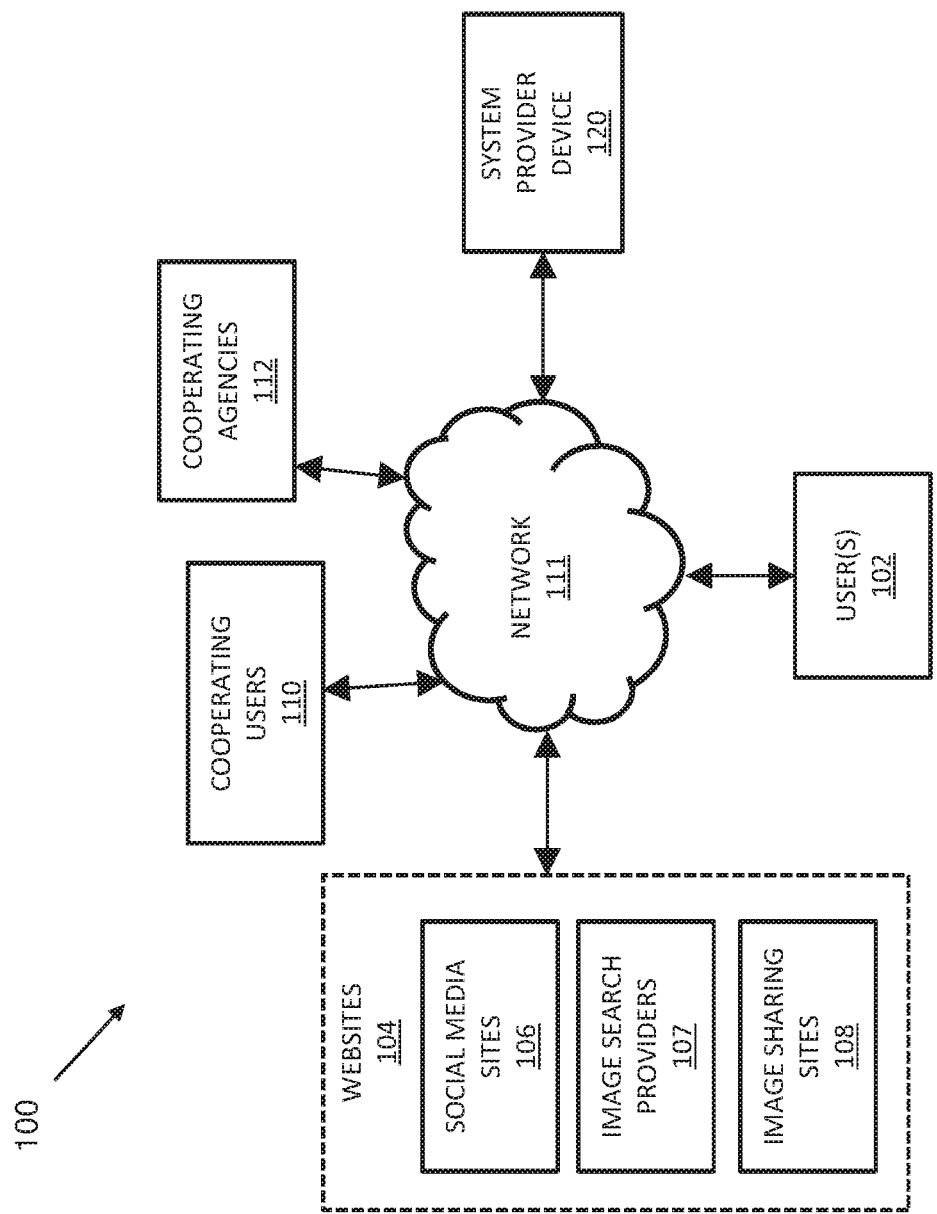
FIG. 1 is a schematic view illustrating an embodiment of a threat intelligence system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing a threat intelligence system which provides a framework for harvesting threat intelligence data. Generally, the framework disclosed herein provides for the retrieval of images posted online, extraction of textual data from the retrieved images (e.g., by an optical character recognition (OCR) process), and storage of the extracted textual data within an indexed and searchable database. In various embodiments, the framework disclosed herein may use the harvested threat intelligence data to identify potential security threats and take appropriate security measures. Additionally, embodiments described herein may be equally applicable to any type of user (e.g., consumers, enterprises including online merchants and/or payment service providers, governments, or other type of user) operating any type of computing device such as a laptop, a desktop, a mobile device, or other appropriate computing device, and where the computing device is able to access the Internet (e.g., through an Internet connection). Further, in various embodiments, the computing device(s) described herein may execute an application that provides for one or more aspects of the threat intelligence system discussed below.

By providing the threat intelligence system as described herein, users of the threat intelligence system are provided with a wealth of information (e.g., the extracted textual data) that is readily and easily accessible (e.g., by the indexed and searchable database), thereby improving detection of potential or existing security threats and allowing for timely countermeasures and investigation. Currently, the popularity and use of social-media sites (e.g., Facebook, Twitter, Pinterest, etc.) and image sharing sites (e.g., Instagram, Imgur, Flickr, etc.) has resulted in users of these sites uploading thousands of images every second to the Internet. However, aside from manually reviewing individual images, which is both time-consuming and impractical, there is currently no efficient way to extract the potential wealth of textual information stored in this mass quantity of images. As such, security-related information present in such images (e.g., screenshots showing details of a planned or ongoing attack, such as screenshots of actual computer code in some instances) may largely go unnoticed, exacerbating the effects of an ongoing security intrusion and/or preventing the timely detection of potential threats.

By way of example, and in accordance with embodiments described herein, the threat intelligence system may be used to download images from any of a plurality of sites. In some examples, such image downloading may be performed autonomously and proactively, and in some cases without the knowledge of users of social-media sites or image sharing sites. In some embodiments, the threat intelligence system includes a "targeted" function, wherein the images are downloaded from one or more targeted websites (e.g., websites known as image repositories for cyber criminals). In some cases, the targeted websites may include particular social media accounts and/or image sharing site accounts belonging to known or suspected cyber-criminals. After downloading the images, the threat intelligence system may perform an optical character recognition (OCR) process on each of the downloaded images to extract textual data from at least a subset of the downloaded images.

The threat intelligence system may then store the extracted textual data in an indexed and searchable database. In some embodiments, and based on the extracted textual data, the threat intelligence system may generate a threat assessment score. In various embodiments, the threat intelligence system may compare the extracted textual data to other textual data previously stored within the indexed and searchable database, and the threat assessment score may be appropriately updated. Generally, and in various embodiments, once one or more sets of textual data is stored within the indexed and searchable database, database searches may be written and performed to mine data related to security threats.

In some cases, and based on the threat assessment score being greater than a threshold value, the threat intelligence system may generate a security alert that may be displayed via a user device of a user of the threat intelligence system. In various embodiments, the security alert may indicate that a potential or known threat has been identified, and in some cases the user may be instructed by the threat intelligence system to further review the image or images that triggered the security alert. In some embodiments, the threat intelligence system may itself automatically retrieve and forward (e.g., to local authorities, security personnel, or other appropriate recipients) identifying information collected from the extracted textual data such as IP addresses, botnet names, aliases, email addresses, user names (e.g., for users of targeted social media sites and/or image sharing sites), website URLs, virus signatures, and/or other information which can be readily acted upon (e.g., as part of an investigative process). The threat intelligence system may thus provide for quick and accurate identification of IOCs, for example, to reduce the impact of, or to prevent malicious activity. Various other embodiments and advantages of the present disclosure will become evident in the discussion that follows and with reference to the accompanying figures.

Referring now to FIG. 1, an embodiment of a threat intelligence system 100 is illustrated. The threat intelligence system 100 includes a user 102. In various embodiments, the user 102 may include any type of user (e.g., consumers, enterprises including online merchants and/or payment service providers, governments, or other type of user) operating any type of computing device such as a laptop, a desktop, a mobile device, or other appropriate computing device. While the embodiments herein are generally shown and described with reference to a single user (e.g., user 102) for the sake of clarity, it will be understood that various embodiments may include a plurality of users at a plurality of physical locations. In various examples, the user 102 includes, corresponds to, or is associated with one or more user devices (e.g., such as the computing devices described above) that are coupled to a network 111 that is further coupled to a system provider device 120. For example, the user 102 and the system provider device 120 are configured to communicate with one another by way of the network 111, for example by way of network communication devices, as discussed below.

In embodiments where the user 102 includes a merchant, the merchant may include a merchant operating at a physical location and/or through a virtual storefront accessible to a customer via a website (e.g., accessible through an Internet connection using a mobile device and/or a personal computer) or via a mobile application executing on the customer's mobile device. In some embodiments, the user 102 may include a plurality of merchants at a plurality of physical locations, a single merchant operating at a plurality of physical locations, a plurality of merchants operating a plurality of virtual storefronts, and/or a single merchant operating a plurality of virtual storefronts. Further, in some embodiments, the user 102 may include a merchant having a physical location such as a department store, a restaurant, a grocery store, a pharmacy, a movie theater, a theme park, a sports stadium, and/or a variety of other physical locations. Moreover, in some embodiments, the user 102 may include a merchant having a mobile location such as a cart, kiosk, trailer, and/or other mobile locations. In addition, in various embodiments, the user 102 may include a merchant having a virtual storefront that serves to complement the merchant physical location. In still other embodiments, the user 102 may include a merchant without a physical location, and may instead only include a virtual storefront, as described above.

The threat intelligence system 100 may also include cooperating users 110 and cooperating agencies 112. For purposes of this disclosure, the cooperating users 110 may include other users, apart from the user 102, that are also users of the threat intelligence system 100 and that share data with the user 102, for example, for the purpose of identifying, preventing, and/or otherwise addressing security threats. In various embodiments, the data shared between the cooperating users 110 and the user 102 may include textual data extracted (e.g., by an OCR process) from images downloaded by the threat intelligence system operating on the cooperating user 110 computing device. By way of example, the cooperating users 110 may in some instances be similar to the user 102 and may thus also include any type of user (e.g., consumers, enterprises including online merchants and/or payment service providers, governments, or other type of user) operating any type of computing device such as a laptop, a desktop, a mobile device, or other appropriate computing device. In various embodiments, the cooperating agencies 112 may include government agencies, law enforcement agencies, security personnel, or other appropriate agencies. By way of example, the user 102 and/or the cooperating users 110 may share extracted textual data with the cooperating agencies 112. As discussed above, such information may also include identifying information collected from the extracted textual data such as IP addresses, botnet names, aliases, email addresses, user names (e.g., for users of targeted social media sites and/or image sharing sites), website URLs, virus signatures, and/or other information which can be readily acted upon (e.g., as part of an investigative process) by the cooperating agencies 112. In some cases, the user 102 and/or the cooperating users 110 may themselves implement security measures or take other appropriate action in response to the extracted textual data and any resulting security alerts. In various examples, the cooperating users 110 and cooperating agencies 112 may also include one or more devices that are coupled to the network 111 that is further coupled to the system provider device 120. Thus, each of the cooperating users 110 and cooperating agencies 112 may likewise couple to the network 111, and to the system provider device 120, via a wired or wireless connection.

As illustrated in FIG. 1, the threat intelligence system 100 further includes a plurality of websites 104. In some cases, the websites 104 may include targeted websites, as described above. In various examples, the websites 104 may include, but are not limited to, social media providers 106 (e.g., such as Facebook, Instagram, Twitter, etc.), image search providers 107 (e.g., Google image search, Bing image search, Yahoo image search, etc.), image sharing sites 108 (e.g., Instagram, Imgur, Flickr, etc.), or other web-based image repositories. As discussed above, users of social media sites and/or image sharing sites may upload images to such websites 104, and the threat intelligence system 100 may be used to download images from one or more of the websites 104 for textual data extraction and threat assessment analysis. In various examples, the websites 104 may include one or more website devices that are coupled to the network 111 that is further coupled to the system provider device 120. Thus, each of the websites 104 may likewise couple to the network 111, and to the system provider device 120, via a wired or wireless connection.

The network 111 may be implemented as a single network or a combination of multiple networks. For example, in various embodiments, the network 111 may include the Internet and/or one or more intranets, landline networks, wireless networks, cellular networks, satellite networks, and/or other appropriate types of networks. In some examples, the user 102 may communicate through the network 111 via cellular communication, by way of one or more merchant network communication devices. In other examples, the user 102 may communicate through the network 111 via wireless communication (e.g., via a WiFi network), by way of one or more network communication devices. In yet other examples, the user 102 may communicate through the network 111 via any of a plurality of other radio and/or telecommunications protocols, by way of one or more network communication devices. In still other embodiments, the user 102 may communication through the network 111 using a Short Message Service (SMS)-based text message, by way of one or more network communication devices.

Figure 10:
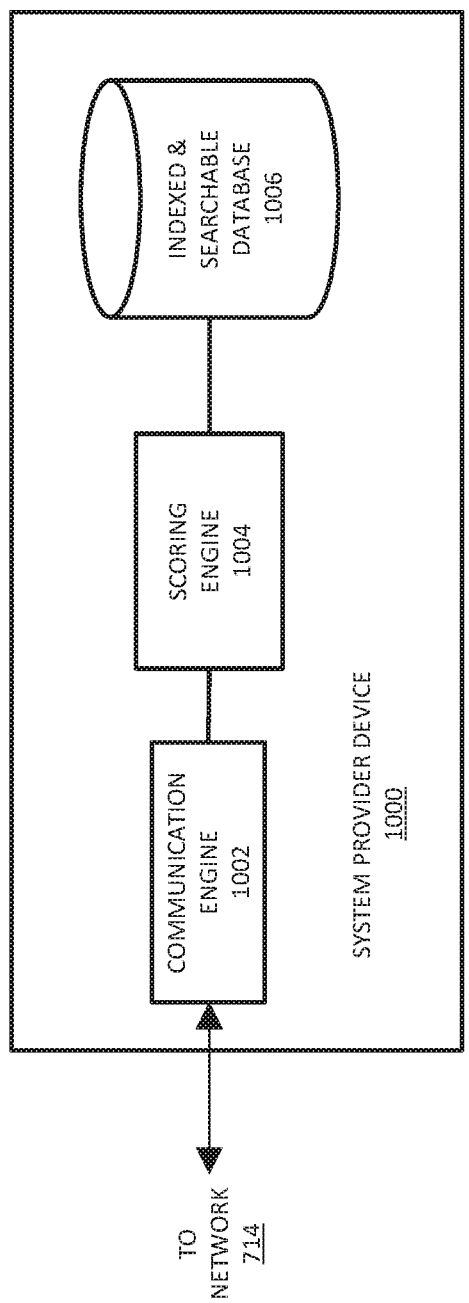
FIG. 10 is a schematic view illustrating an embodiment of a system provider device.

The system provider device 120 may likewise couple to the network 111 via a wired or wireless connection. As described in more detail below with reference to FIG. 10, the system provider device 120 may include a scoring engine, a communication engine, and an indexed and searchable database (e.g., within which the extracted textual data is stored). Software or instructions stored on a computer-readable medium, and executed by one or more processors of the system provider device 120, allows the system provider device 120 to send and receive information over the network 111. Furthermore, the scoring engine in the system provider device 120 may be configured to implement various embodiments of the threat intelligence system 100 as described herein. In some examples, the system provider device 120 is configured to download a plurality of images from one or more websites (e.g., such as the websites 104). In various embodiments, the system provider device 120 may perform an OCR process on each of the downloaded images to extract textual data from at least a subset of the downloaded images. The system provider device 120 may then store the extracted textual data in an indexed and searchable database (e.g., as shown in FIG. 10). In some embodiments, and based on the extracted textual data, the system provider device 120 may generate a threat assessment score (e.g., via the scoring engine). In various embodiments, the system provider device 120 may compare the extracted textual data to other textual data previously stored within the indexed and searchable database, and the threat assessment score may be appropriately updated. In some cases, and based on the threat assessment score being greater than a threshold value, the system provider device 120 may generate a security alert that may be displayed via a user device (e.g., of the user 102). In some embodiments, the system provider device 120 may forward (e.g., to the cooperating users 110 and/or the cooperating agencies 112) identifying information collected from the extracted textual data such as IP addresses, botnet names, aliases, email addresses, user names (e.g., for users of targeted social media sites and/or image sharing sites), website URLs, virus signatures, and/or other information which can be readily acted upon (e.g., as part of an investigative process). It is further noted that in some embodiments, the system provider (e.g., operating the system provider device 120) may include a payment service provider such as, for example, PayPal Inc. of San Jose, Calif., that provides the threat intelligence system 100 for the user 102, as well as for any other users that may be associated with implementations of the threat intelligence system 100 (e.g., such as the cooperating users 110 or others).

Information sent and received through the network 111, website devices, cooperating user and cooperating agency devices, and user devices may be associated with images in a database located in a non-transitory memory, and any use of that information may be stored in association with implementation of one or more aspects of embodiments of the threat intelligence system 100. Furthermore, the payment service provider may provide the threat intelligence system 100 for a plurality of different users, similarly as described for the user 102, discussed below. Thus, references to a system provider operating a system provider device below may refer to a payment service provider operating a payment service provider device, or may refer to any other entity providing a threat intelligence system separate from or in cooperation with a payment service provider.

Figure 2:
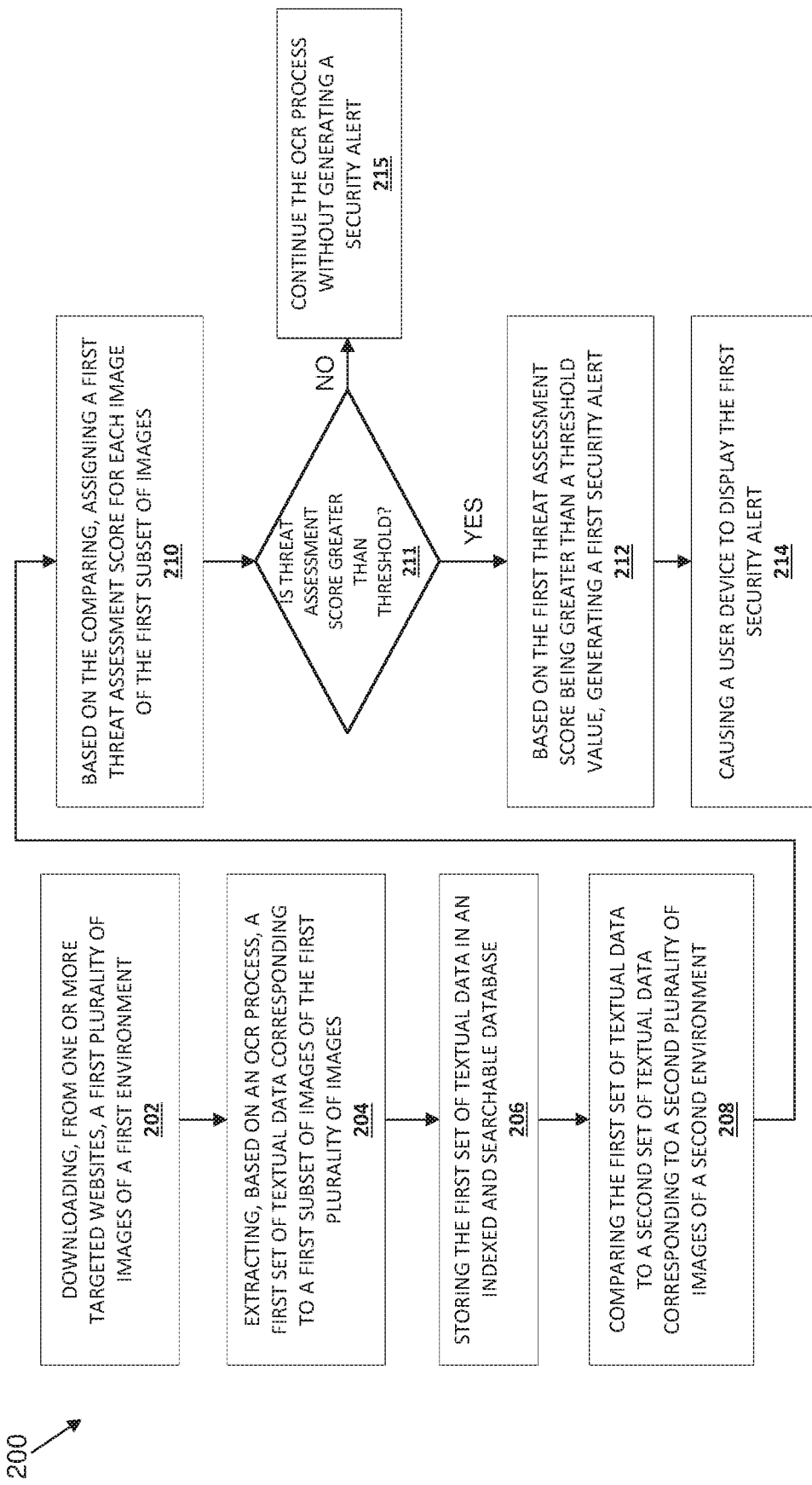
FIG. 2 is a flow chart illustrating an embodiment of a method for providing a threat intelligence system.

Referring now to FIG. 2, an embodiment of a method 200 for providing a threat intelligence system is illustrated. One of skill in the art in possession of the present disclosure will recognize that the method 200 may be performed for any of a plurality of different users (e.g., consumers, enterprises including online merchants and/or payment service providers, governments, or other type of user), for example, using any of a plurality of user devices, such as those previously described. It will also be understood that additional steps may be performed before, during, and/or after the steps described below with reference to the method 200. In particular, with reference to FIGS. 3-6, various aspects of the method 200 are illustrated and described. Additionally, in the various embodiments disclosed herein, a system provider application and/or a payment service provider application providing the threat intelligence system may be implemented (e.g., on a user computing device) as one or more application program interfaces (APIs), as a plug-in (e.g., such as a web browser plug-in), or according to another appropriate method.

Figure 3:
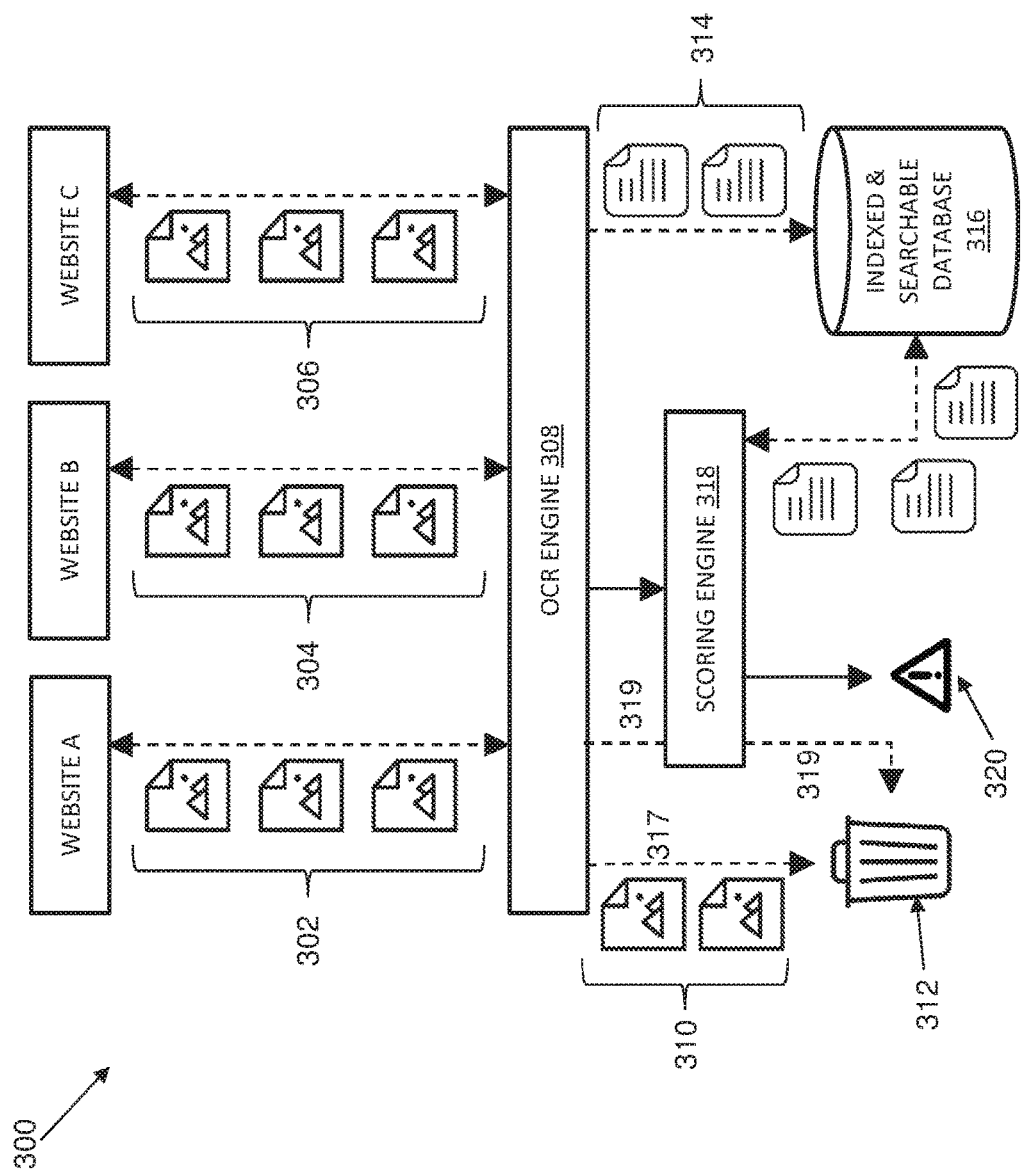
FIG. 3 illustrates a schematic diagram providing an exemplary process flow for the threat intelligence system.

The method 200 begins at block 202 where a first plurality of images are downloaded, for example, from one or more websites. In some embodiments, the one or more websites may include targeted websites (e.g., websites known or suspected to be image repositories for cyber criminals). In some cases, the targeted websites may include particular social media accounts and/or image sharing site accounts belonging to known or suspected cyber-criminals. Referring to FIG. 3, and in an embodiment of block 202, illustrated therein is a schematic diagram 300 that provides an exemplary process flow for the threat intelligence system disclosed herein. By way of example, FIG. 3 illustrates three websites ('Website A', 'Website B', and 'Website C') that have been targeted by the threat intelligence system for downloading of images as indicated by image icons 302, 304, 306. It will be understood that the three websites shown are merely illustrative, and the threat intelligence system disclosed herein may interact with and download images from any number of websites simultaneously without departing from the scope of the present disclosure.

In various embodiments, the images downloaded from the targeted websites may include any type of image such as candid images, food images, landscape images, portrait images, sports images, wildlife images, home office images, or any other type of image. As such, some of the images downloaded may not necessarily be relevant to computer and/or network security, as discussed in more detail below. As previously described, images having security-related information (e.g., screenshots showing details of a planned or ongoing attack) may be of relatively high relevance to the threat intelligence system 100. Often, images with such security-related information include images of a cyber-criminal's computer screen, written notes, whiteboards, office, or any other type of image of their work environment.

Figure 4:
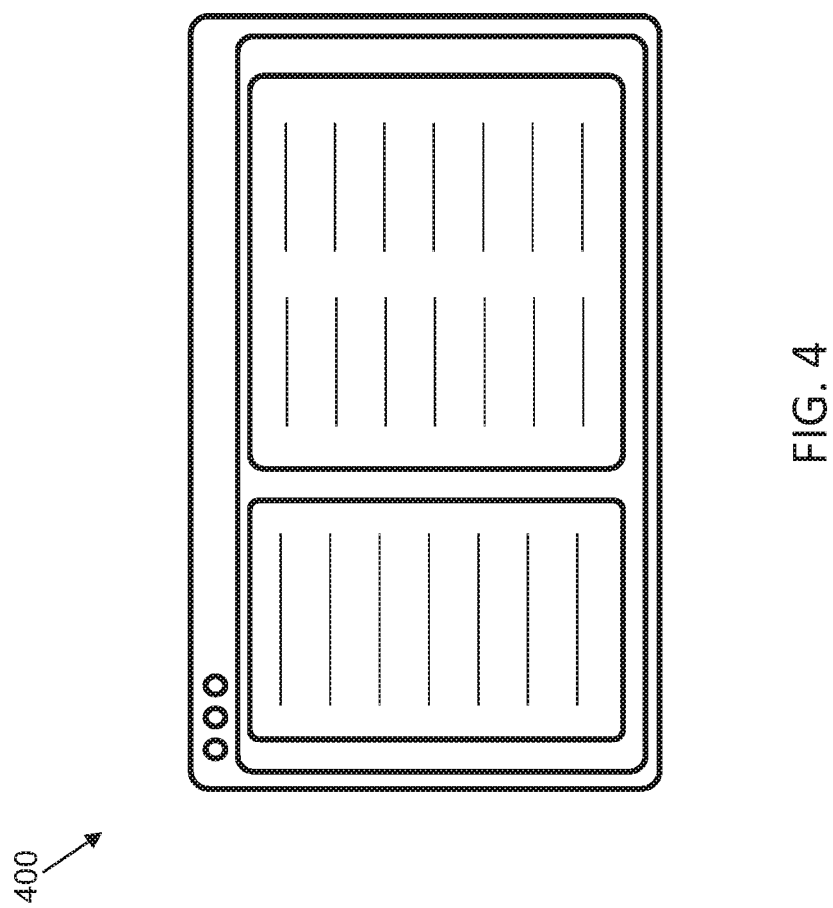
FIG. 4 illustrates an embodiment of a screenshot image of a first environment including a user device displaying text.

By way of example, FIG. 4 illustrates a screenshot image 400 displaying text, for example, taken from an actor's (e.g., a cyber-criminal's) computer screen. In some embodiments, the displayed text may include information related to and/or indicative of a planned or ongoing computer or network attack (e.g., such as a DDoS attack). For example, the text displayed on the screenshot image 400 may include IP addresses, botnet names, aliases, email addresses, user names (e.g., for users of targeted social media sites and/or image sharing sites), website URLs, virus signatures, and/or other relevant security-related information. In accordance with embodiments of the present disclosure, such security-related textual information may be extracted by way of the OCR process implemented by the threat intelligent system. For purposes of the present discussion, the screenshot depicted in the screenshot image 400 of FIG. 4 may be referred to as a "work environment" or simply "environment". Thus, the screenshot image 400 may be referred to as an image of a work environment, or simply as an image of an environment. In some cases, the text displayed in the screenshot image 400 and recognized by the OCR process may not have any security implications, may provide partial information related to a particular security event (e.g., an intrusion), or may provide complete identifying information. As discussed in more detail below, the importance (e.g., with respect to a security event) of text extracted from a particular image may be determined by the scoring engine, and the scoring engine may thus assign an appropriate threat assessment score.

Figure 5:
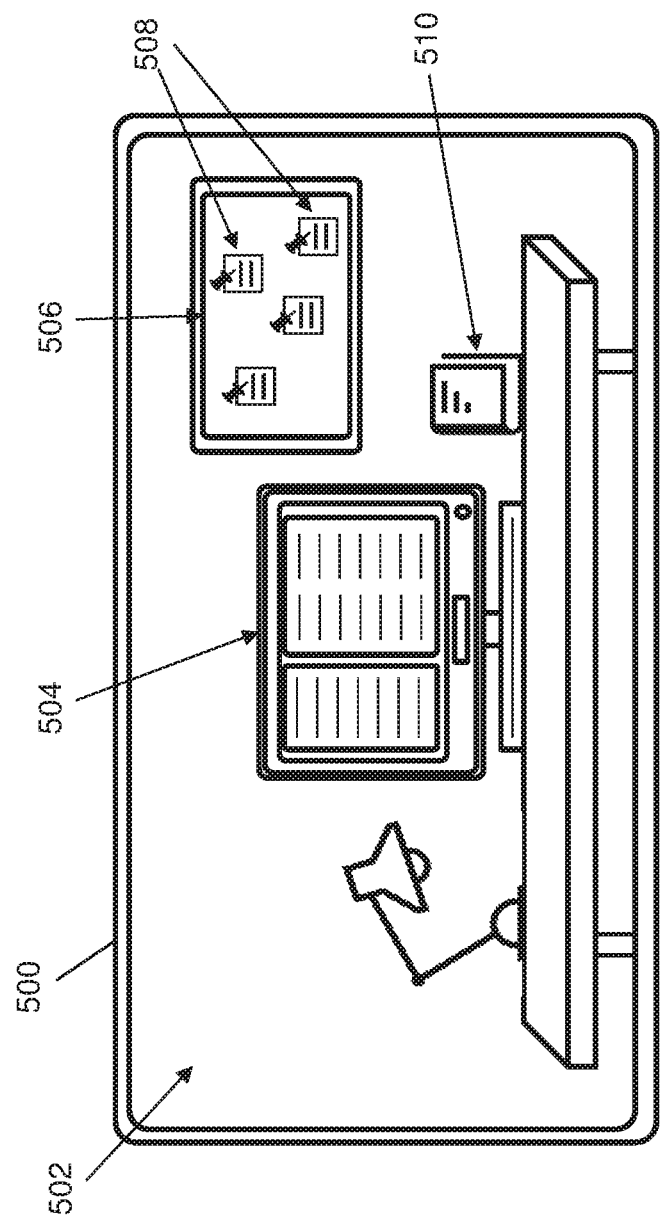
FIG. 5 illustrates an embodiment of an image of a second environment, such as an office environment, displaying text.

As another example, FIG. 5 illustrates an image 500 of an office environment 502. In some embodiments, the illustrated office environment 502 may include an actor's (e.g., a cyber-criminal's) home office or other work environment. Thus, the image 500 may, like the screenshot image 400, be referred to as an image of a work environment, or simply as an image of an environment. As shown in FIG. 5, the image 500 may include a screenshot image 504 (e.g., which may be the screenshot image 400), but because the image 500 provides a wider field of view, other security-related textual information may be found within the office environment 502. For example, the image 500 may include a corkboard 506 having one or more notes 508 affixed thereto, where the one or more notes 508 may include security-related textual information. Additionally, the image 500 may include a textbook or notepad 510 including security-related textual information. While a few examples of textual information that may be depicted within the environment 502 have been given, other types of textual information may also be depicted without departing from the scope of the present disclosure. The threat intelligence system may extract the security-related textual information from the image 500, for example, by way of the OCR process. As with the screenshot image 400, the text displayed in the image 500 of the office environment 502 may in some cases not have any security implications, may provide partial information related to a particular security event (e.g., an intrusion), or may provide complete identifying information, and the scoring engine may assign an appropriate threat assessment score.

While FIGS. 4 and 5 provide illustrative examples of environments that may contain security-related textual information, these examples are merely illustrative. It will be understood that any type of image and any type of environment may contain relevant security-related textual information, and the threat intelligence system disclosed herein provides for identification, classification, and threat assessment of extracted textual information no matter the type of image or type of environment depicted by the image.

Thus, following block 202, the system provider device 120 has downloaded a first plurality of images of a first environment from one or more targeted websites. As discussed below, the system provider device 120 may then extract a set of textual data from at least a subset of images of the downloaded first plurality of images.

The method 200 proceeds to block 204 where, based on an OCR process, a set of textual data is extracted. In some embodiments, the extracted textual data corresponds to at least a subset of images of the downloaded plurality of images. By way of example, in an embodiment of block 204 and referring again to FIG. 3, the system provider may employ an OCR engine 308 to process the downloaded plurality of images. In some embodiments, the threat intelligence system may process one or more images of the downloaded plurality of images (e.g., using an image processor) to improve an image quality of the one or more images prior to textual data extraction by the OCR engine 308. In some cases, the OCR engine 308 may be part of the system provider device. Alternatively, in some embodiments, the OCR engine 308 may operate separately from, but be in communication with, the system provider device. By way of example, the OCR engine 308 performs an optical character recognition process to each image of the downloaded plurality of images (e.g., from 'Website A', 'Website B', and 'Website C'). Thus, in various embodiments, the OCR engine 308 may be used to recognize text present in the downloaded plurality of images. In some cases, one or more downloaded images may not depict any text, as detectable by the OCR engine 308. As shown in FIG. 3, images (e.g., indicated by image icons 310) that do not depict any text may be directly discarded/deleted (arrow 317), for example, as indicated by trash icon 312. To be sure, in some embodiments, images that do not depict text may first be assigned a threat assessment score by scoring engine 318 (arrow 319), and based on the assigned threat assessment score, the images that do not depict text may in some cases be discarded, as indicated by trash icon 312. Generally, in various embodiments, a threat assessment score of an image that does not depict text may be lower than a threat assessment score of an image that does depict text.

Thus, following block 204, the system provider device has extracted textual data corresponding to at least a subset of images of the downloaded plurality of images, where an OCR process is used to extract the textual data from the images, and where the images depict text within an environment (e.g., such as a work environment).

The method 200 proceeds to block 206 where the extracted textual data is stored in an indexed and searchable database. As shown in FIG. 3, and in an embodiment of block 206, textual data (e.g., indicated by icons 314) extracted by the OCR engine 308 may be stored in indexed and searchable database 316. While the textual data (e.g., indicated by icons 314) is shown as being stored in the indexed and searchable database 316 directly after processing by the OCR engine 308, in some embodiments, the OCR-extracted textual data may first be processed by a scoring engine 318, for example to determine a threat assessment score, prior to storage in the indexed and searchable database 316. Moreover, textual data (e.g., indicated by icons 314) initially stored in the indexed and searchable database 316 may subsequently be processed by the scoring engine 318, for example, to determine a threat assessment score. In some embodiments, the first threat assessment score generated/determined for a given set of textual data corresponding to a particular image may be described as an initial threat assessment score. Subsequent data processing by the threat intelligence system, for example including comparison of textual data sets to each other, may result in updating of the initial threat assessment score. By way of example, the indexed and searchable database 316 may include a relational database, a structured query language (SQL) database, or other suitable database. Additionally, in various embodiments, the indexed and searchable database 316 may dynamically expand or contract as necessary to accommodate the textual data extracted (e.g., by the OCR process) from images downloaded from the one or more targeted websites. Thus, following blocks 206, the system provider device has stored the extracted textual data in the indexed and searchable database.

The method 200 proceeds to block 208 where the extracted textual data (block 204) is compared to another set of textual data (e.g., previously stored in the database 316) corresponding to a second plurality of images of a second environment (e.g., a second work environment different than the first work environment). With reference to FIG. 3, and in an embodiment of block 208, both the extracted textual data (block 204), as well as any other textual data sets may be stored in the indexed and searchable database 316. Thus, the threat intelligence system may readily compare two or more datasets to each other. In some embodiments, comparing the textual datasets to each other may include determining whether the compared datasets, as a whole, contain actionable security related information, or generally what security determinations made be made by considering the extracted textual data (block 204) in view of other extracted textual data. Stated another way, the textual data stored in the indexed and searchable database is mined in search of data related to security threats. The method 200 proceeds to block 210, where based on the comparing, a first threat assessment score is assigned for each image of the first subset of images. As a result of the comparison (block 208), and in an embodiment of block 210, a previously determined initial threat assessment score may be updated (e.g., from the initial threat assessment score to the first threat assessment score). In general, different threat assessment scores may be assigned to each image, or to different subsets of images, of the plurality of downloaded images based on the extracted textual data (e.g., extracted by the OCR engine 308) for each image or each subset of images and/or based on comparison of different textual data sets.

Thus, following blocks 208 and 210, the system provider device has compared a first set of textual data corresponding to a first set of images of a first environment to a second set of textual data corresponding to a second set of images of a second environment, and based on the comparison, a first threat assessment score has been assigned for each image of the first set of images.

The method 200 proceeds to block 211 where it is determined whether the threat assessment score (block 210) is greater than a threshold value. If the threat assessment score is greater than the threshold value, then the method 200 proceeds to block 212 where the system generates a security alert 320 (FIG. 3). In some embodiments, the threat assessment scores of each image of the first subset of images are considered collectively, meaning that if the threat assessment score for each image of the first subset of images is greater than the threshold value then a first type of alert is generated. Alternatively, and in some cases, the threat assessment scores of each image of the first subset of images are considered individually, meaning that if the threat assessment score for one or more images of the first subset of images is greater than the threshold value then a second type of alert is generated. Generally, the threat intelligence system may generate various types of alerts, for example, signifying various types of threats, where the various type of alerts may depend in part on the number of images having a threat assessment score greater than the threshold value and/or on the content (e.g., security-related information) extracted from a given image. By way of example, a threat assessment score that is greater than a threshold value may indicate that the threat intelligence system has collected sufficiently identifying and/or actionable information. In some embodiments, the initial threat assessment score may be greater than a threshold value and may result in generation of the security alert. In some cases, the initial threat assessment score is below the threshold value, but the updated threat assessment score (e.g., generated after comparison of textual datasets) may be greater than the threshold value. In some embodiments, a threat assessment score that is greater than a threshold value may indicate that a planned or ongoing attack has been identified. In some cases, this may include identification of one or more indicators of compromise (IOCs) such as virus signatures, IP addresses, botnet names, aliases, email addresses, URLs or domain names of botnet command and control servers, or other IOCs. In various embodiments, such information may be readily acted upon (e.g., as part of an investigative process). In some cases, and as a result of a threat assessment score that is greater than a threshold value, IOCs or other relevant information may be forwarded (e.g., to local authorities, security personnel, or other appropriate recipients) and appropriate countermeasures can be taken. Thus, following block 212, a security alert has been generated based on a threat assessment score being greater than a threshold value. Returning to block 211, if the threat assessment score is less than the threshold value, then the method 200 proceeds to block 215 where the OCR process may continue without generating a security alert.

Assuming that system generates a security alert at block 212, the method 200 proceeds to block 214 where the system provider causes a user device to display the security alert. By way of example, the user device may include any type of computing device such as a laptop, a desktop, a mobile device, or other appropriate computing device that is operated by any type of user (e.g., consumers, enterprises including online merchants and/or payment service providers, governments, or other type of user). In some cases, the generated alert may prompt a user to take action appropriate for a given security threat. However, in some embodiments, the generated alert may be informational in nature, with the threat intelligence system automatically performing appropriate security countermeasures.

Figure 6:
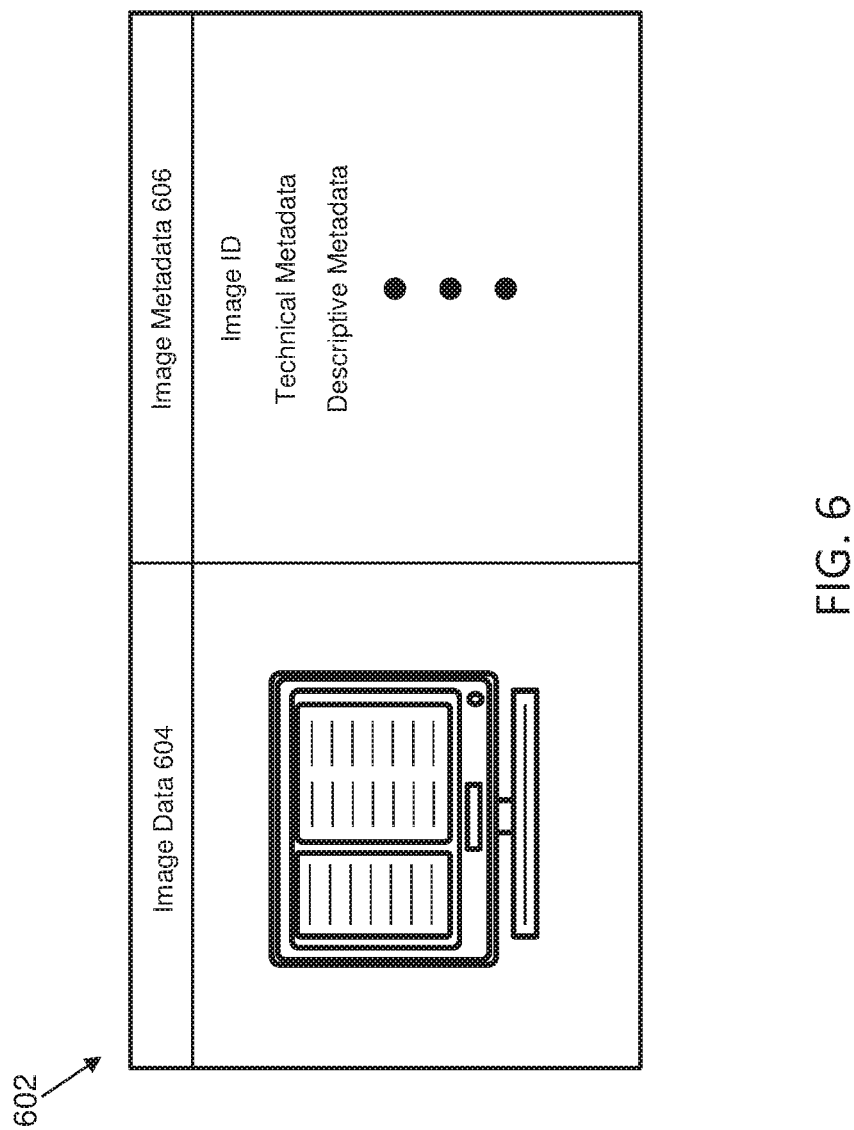
FIG. 6 is an illustrative view of an image file including image data and image metadata, in accordance with some embodiments.

It will be understood that the examples given above, for example with reference to the method 200, are merely exemplary and are not meant be limiting in any way. Moreover, those of skill in the art in possession of this disclosure will recognize that various additional embodiments may be implemented in accordance with the methods described herein, while remaining within the scope of the present disclosure. For example, with reference to FIG. 6, illustrated therein is an example of an image file 602, where the image file includes image data 604 and image metadata 606. In some embodiments, the image data 604 includes an actual image that is downloaded (e.g., from one or more targeted websites), and the image metadata 606 may include any of a variety of identifying information such as an image identification (Image ID), technical metadata such as camera settings, image date and time, and GPS information, and descriptive metadata such as keywords related to the image, captions, titles, comments, etc. In accordance with some embodiments, the extracted textual data (e.g., block 204) may be associated with corresponding image metadata 606, where the image metadata provides a context for the extracted textual data. In some examples, the context includes geolocation information, date information, time information, or other relevant information provided by the image metadata 606. In addition, and in some embodiments, a previously determined threat assessment score for each image may be updated based on the associated image metadata.

Thus, systems and methods have been described which provide a threat intelligence system which provides a framework for harvesting threat intelligence data. In various examples, and in accordance with the various embodiments described herein, the system provider device may be used to download images from any of a plurality of targeted websites, as described above. In various examples, the threat intelligence system may then perform an OCR process on each of the downloaded images to extract textual data from at least a subset of the downloaded images. The extracted textual data is saved to an indexed and searchable database. Based on the extracted textual data, the threat intelligence system may generate a threat assessment score. In various embodiments, the threat intelligence system may compare the extracted textual data to other textual data previously stored within the indexed and searchable database, and the threat assessment score may be appropriately updated. In some cases, and based on the threat assessment score being greater than a threshold value, the threat intelligence system may generate a security alert that may be displayed via a user device. In various embodiments, the security alert may indicate that a potential or known threat has been identified. In some embodiments, the threat intelligence system may automatically retrieve and forward (e.g., to local authorities, security personnel, or other appropriate recipients) identifying information collected from the extracted textual data such as IP addresses, botnet names, aliases, email addresses, user names (e.g., for users of targeted social media sites and/or image sharing sites), website URLs, virus signatures, and/or other information which can be readily acted upon (e.g., as part of an investigative process). The threat intelligence system may thus provide for quick and accurate identification of IOCs, for example, to reduce the impact of, or to prevent malicious activity. It is additionally noted that the embodiments described herein describe technological solutions to problems associated with computer network security, which include business practices that did not exist prior to the advent of computer networks and the Internet. Various examples of technological devices and systems that may be used to implement embodiments of the present disclosure are discussed in more detail below with reference to FIGS. 7-10.

Figure 7:
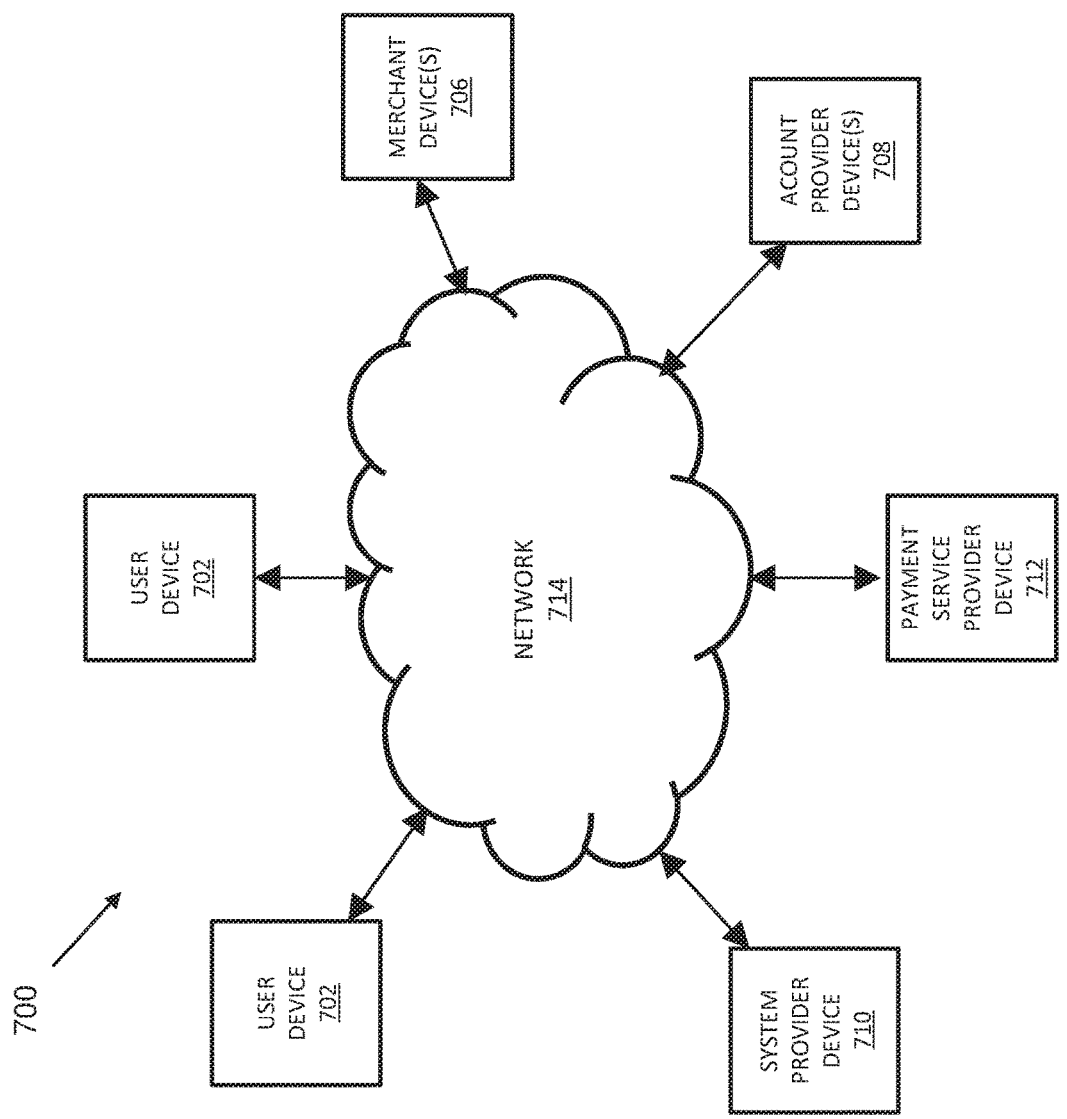
FIG. 7 is a schematic view illustrating an embodiment of a networked system.

Referring first to FIG. 7, an embodiment of a network-based system 700 for implementing one or more processes described herein is illustrated. As shown, the network-based system 700 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 700 illustrated in FIG. 7 includes a plurality of user devices 702, a plurality of merchant devices 706, a payment service provider device 712, account provider device(s) 708, and/or a system provider device 710 in communication over one or more networks 714. The user devices 702 may be the user devices discussed above and may be operated by the users discussed above. The merchant devices 706 may be the merchant devices discussed above and may be operated by the merchants discussed above. In some examples, the merchant devices may be the user devices, as described above. The payment service provider device 712 may be the payment service provider devices discussed above and may be operated by a payment service provider such as, for example, PayPal Inc. of San Jose, Calif. The system provider devices 710 may be the system provider devices discussed above and may be operated by the system providers discussed above. The account provider devices 708 may be operated by credit card account providers, bank account providers, savings account providers, and a variety of other account providers known in the art.

The user devices 702, merchant devices 706, payment service provider device 712, account provider devices 708, and/or system provider device 710 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 714.

The network 714 may be implemented as a single network or a combination of multiple networks. For example, in various embodiments, the network 714 may include the Internet and/or one or more intranets, landline networks, wireless networks, and/or other appropriate types of networks.

The user devices 702 and/or merchant devices 706 may be implemented using any appropriate combination of hardware and/or software configured for wired and/or wireless communication over network 714. For example, in one embodiment, the user devices 702 and/or merchant devices 706 may be implemented as a personal computer of a user in communication with the Internet. In other embodiments, the user devices 702 and/or merchant devices 706 may be a smart phone, wearable computing device, laptop computer, and/or other types of computing devices.

The user devices 702 and/or merchant devices 706 may include one or more browser applications which may be used, for example, to provide a convenient interface to permit the customer to browse information available over the network 714. For example, in one embodiment, the browser application may be implemented as a web browser configured to view information available over the Internet.

The user devices 702 and/or merchant devices 706 may also include one or more toolbar applications which may be used, for example, to provide user-side processing for performing desired tasks in response to operations selected by the customer and/or the merchant. In one embodiment, the toolbar application may display a user interface in connection with the browser application.

The user devices 702 and/or merchant devices 706 may further include other applications as may be desired in particular embodiments to provide desired features to the user devices 702 and/or merchant devices 706. In particular, the other applications may include a payment application for payments assisted by a payment service provider through the payment service provider device 712. The other applications may also include security applications for implementing user-side security features, programmatic user applications for interfacing with appropriate application programming interfaces (APIs) over the network 714, or other types of applications. Email and/or text applications may also be included, which allow a user payer to send and receive emails and/or text messages through the network 714. The user devices 702 and/or merchant devices 706 may include one or more user and/or device identifiers which may be implemented, for example, as operating system registry entries, cookies associated with the browser application, identifiers associated with hardware of the user devices 702 and/or merchant devices 706, or other appropriate identifiers, such as a phone number. In one embodiment, the user identifier may be used by the payment service provider device 712 and/or account provider device 708 to associate the user with a particular account as further described herein.

The merchant devices 706 may be maintained, for example, by a conventional or online merchant, conventional or digital goods seller, individual seller, and/or application developer offering various products and/or services in exchange for payment to be received conventionally or over the network 714. In this regard, the merchant device 706 may include a database identifying available products and/or services (e.g., collectively referred to as items) which may be made available for viewing and purchase by the user.

The merchant devices 706 may also include a checkout application which may be configured to facilitate the purchase by the payer of items. The checkout application may be configured to accept payment information from the user through the user devices 702, the account provider through the account provider device 708, and/or from the payment service provider through the payment service provider device 712 over the network 714. The merchant devices 706 may also include a system provider application to implement one or more aspects of the method 200 and/or other aspects of the various embodiments described herein.

Figure 8:
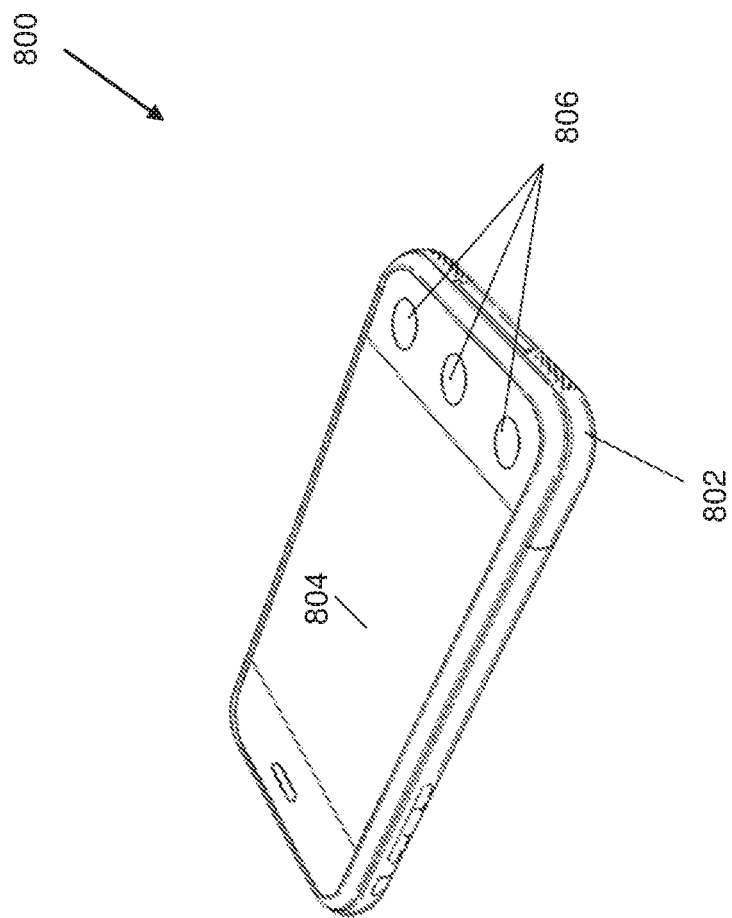
FIG. 8 is a perspective view illustrating an embodiment of a user device.

Referring now to FIG. 8, an embodiment of a user device 800 is illustrated. The user device 800 may be the user device 702 discussed above. The user device 800 includes a chassis 802 having a display 804 and an input device including the display 804 and a plurality of input buttons 806. One of skill in the art will recognize that the user device 800 is a portable or mobile phone including a touch screen input device and a plurality of input buttons that allow the functionality discussed above with reference to the methods above. However, a variety of other portable/mobile merchant devices and/or desktop merchant devices may be used in the methods discussed above without departing from the scope of the present disclosure.

Figure 9:
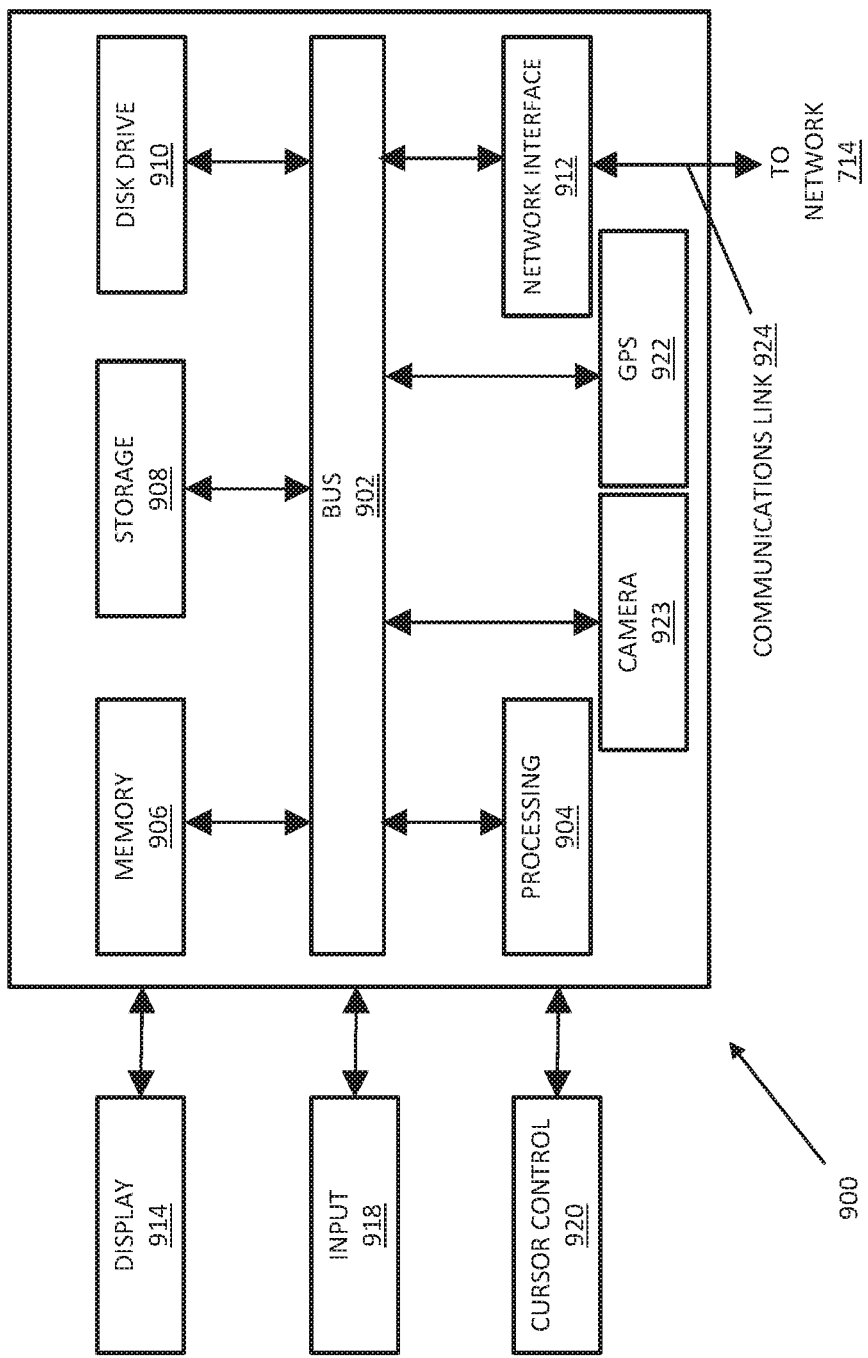
FIG. 9 is a schematic view illustrating an embodiment of a computer system.

Referring now to FIG. 9, an embodiment of a computer system 900 suitable for implementing, for example, the user device 702 or 800, the merchant device 706, the payment service provider device 712, the account provider device(s) 708, and/or the system provider devices 120 or 710, is illustrated. It should be appreciated that other devices utilized by users, merchants, payment service providers, account provider device(s), and/or system providers in the system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a location determination component 922 (e.g., a Global Positioning System (GPS) device as illustrated, a cell tower triangulation device, and/or a variety of other location determination devices known in the art), and/or a camera component 923. In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the user device 702 or 800, the merchant device 706, the payment service provider device 712, the account provider device(s) 708, and/or the system provider devices 120 or 710. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 714 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Referring now to FIG. 10, an embodiment of a system provider device 1000 is illustrated. In an embodiment, the device 1000 may be the system provider devices discussed above. The device 1000 includes a communication engine 1002 that is coupled to the network 714 and to scoring engine 1004 that is coupled to an indexed and searchable database 1406. The communication engine 1002 may be software or instructions stored on a computer-readable medium that allows the device 1000 to send and receive information over the network 714. The scoring engine 1004 may be software or instructions stored on a computer-readable medium that, when executed by a processor, is configured to download images, extract textual information from the downloaded images (e.g., via an OCR process), assign and/or update a threat assessment score, and generate a security alert, as well as provide any of the other functionality that is discussed above. While the database 1006 has been illustrated as located in the device 1000, one of skill in the art will recognize that the database may be connected to the scoring engine 1004 through the network 714 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A threat intelligence system, comprising:
a non-transitory memory; and
one or more hardware processors coupled to the non-transitory memory and configured to read instructions from the non-transitory memory to cause the system to perform operations comprising:
extracting, based on a first optical character recognition (OCR) process, a first set of textual data corresponding to a first subset of images of a first plurality of images, the first subset of images depicting text within a first environment;
storing the extracted first set of textual data in an indexed and searchable database, wherein the extracted first set of textual data provides an entire output of the first OCR process;
extracting, based on a second OCR process, a second set of textual data corresponding to a second plurality of images, the second plurality of images depicting text within a second environment;
storing the extracted second set of textual data in the indexed and searchable database, wherein the extracted second set of textual data provides an entire output of the second OCR process;
prior to comparing the entire output of the first OCR process to the entire output of the second OCR process, generating, using the extracted first set of textual data, a plurality of initial threat assessment scores, wherein each image of the first subset of images is assigned its own initial threat assessment score from the plurality of initial threat assessment scores;
after generating the plurality of initial threat assessment scores, comparing the entire output of the first OCR process to the entire output of the second OCR process;
based on the comparing the entire output of the first OCR process to the entire output of the second OCR process, updating the plurality of initial threat assessment scores to a plurality of first threat assessment scores, wherein each image of the first subset of images is assigned its own first threat assessment score from the plurality of first threat assessment scores;

based on the first threat assessment score for at least one image of the first subset of images being greater than a threshold value, generating a first security alert; and causing a user device to display the first security alert.

2. The system of claim 1, wherein the operations further comprise:

based on the initial threat assessment score for at least one image of the first subset of images, generating an initial security alert; and causing the user device to display the initial security alert.

3. The system of claim 1, wherein the operations further comprise:

processing an image of the first subset of images to improve an image quality of the image; and after processing the image, extracting the first set of textual data.

4. The system of claim 1, wherein the operations further comprise:

associating the first set of textual data with image metadata corresponding to the first subset of images, wherein the image metadata provides a context for the first set of textual data.

5. The system of claim 4, wherein the context includes geolocation information, date information, or time information.

6. The system of claim 4, wherein the operations further comprise:

based on the associated image metadata, updating the first threat assessment score for each image of the first plurality of images.

7. The system of claim 1, wherein the operations further comprise:

executing a third OCR process on a second subset of images of the first plurality of images;

determining that the second subset of images do not depict text; and assigning a second threat assessment score to each image of the second subset of images.

8. The system of claim 7, wherein the second threat assessment score represents a lower threat level than the first threat assessment score.

9. The system of claim 7, wherein the operations further comprise:

based on the second threat assessment score, discarding one or more images of the second subset of images.

10. The system of claim 1, wherein the operations further comprise:

extracting, based on a third OCR process, a third set of textual data corresponding to a third subset of images of the first plurality of images, the third subset of images depicting text within the first environment;

storing the third set of textual data in the indexed and searchable database;

based on the third set of textual data, assigning a third threat assessment score to each image of the third subset of images;

comparing the third set of textual data to the first set of textual data and the second set of textual data;

based on the comparing the third set of textual data to the first set of textual data and the second set of textual data, updating the third threat assessment score for each image of the third subset of images; and based on the third threat assessment score and the updated third threat assessment score being less than the threshold value, continuing to execute the third OCR process without generating a second security alert.

11. The system of claim 1, wherein the first threat assessment score for the at least one image of the first subset of images is greater than the initial threat assessment score for the at least one image of the first subset of images, and wherein the updating the plurality of initial threat assessment scores includes automatically increasing the initial threat assessment score for the at least one image of the first subset of images to the first threat assessment score for the at least one image of the first subset of images based on the comparing.

12. A method for providing a threat intelligence system, comprising:

extracting, by a system provider device and based on a first optical character recognition (OCR) process, a first set of textual data corresponding to a first subset of images of a first plurality of images of a first environment, the first subset of images depicting text within the first environment;

extracting, by the system provider device and based on a second OCR process, a second set of textual data corresponding to a second plurality of images of a second environment, the second plurality of images depicting text within the second environment;

prior to comparing an entire output of the first OCR process including the extracted first set of textual data to an entire output of the second OCR process including the extracted second set of textual data, generating, by the system provider device and using the extracted first set of textual data, a plurality of initial threat assessment scores, wherein each image of the first subset of images is assigned its own initial threat assessment score from the plurality of initial threat assessment scores;

after generating the plurality of initial threat assessment scores, comparing, by the system provider device, the entire output of the first OCR process to the entire output of the second OCR process;

based on the comparing the entire output of the first OCR process to the entire output of the second OCR process, updating, by the system provider device, the plurality of initial threat assessment scores to a plurality of first threat assessment scores, wherein each image of the first subset of images is assigned its own first threat assessment score from the plurality of first threat assessment scores;

based on the first threat assessment score for at least one image of the first subset of images being greater than a threshold value, generating, by the system provider device, a first security alert; and causing, by the system provider device, a user device to display the first security alert.

13. The method of claim 12, further comprising:

based on the initial threat assessment score for at least one image of the first subset of images, generating, by the system provider device, an initial security alert; and causing, by the system provider device, the user device to display the initial security alert.

14. The method of claim 12, further comprising:

executing, by the system provider device, a third OCR process on a second subset of images of the first plurality of images;

determining, by the system provider device, that the second subset of images do not depict text; and assigning, by the system provider device, a second threat assessment score to each image of the second subset of images.

15. The method of claim 14, wherein the second threat assessment score represents a lower threat level than the first threat assessment score.

16. The method of claim 14, further comprising:
based on the second threat assessment score, discarding, by the system provider device, one or more images of the second subset of images.

17. The method of claim 12, wherein the first threat assessment score for the at least one image of the first subset of images is greater than the initial threat assessment score for the at least one image of the first subset of images, and wherein the updating the plurality of initial threat assessment scores includes automatically increasing the initial threat assessment score for the at least one image of the first subset of images to the first threat assessment score for the at least one image of the first subset of images based on the comparing.

18. A non-transitory machine-readable medium having stored thereon machine-readable instructions executable to cause a machine to perform operations comprising:
extracting, based on a first optical character recognition (OCR) process, a first set of textual data corresponding to a first subset of images of a first plurality of images of a first environment, the first subset of images depicting text within the first environment;
extracting, based on a second OCR process, a second set of textual data corresponding to a second plurality of images of a second environment, the second set of textual data previously stored in an indexed and searchable database and the second plurality of images depicting text within the second environment;
prior to comparing an entire output of the first OCR process including the extracted first set of textual data to an entire output of the second OCR process including the extracted second set of textual data, generating, using the extracted first set of textual data, a plurality of initial threat assessment scores, wherein each image of the first subset of images is assigned its own initial threat assessment score from the plurality of initial threat assessment scores;
after generating the plurality of initial threat assessment scores, comparing the entire output of the first OCR process to the entire output of the second OCR process;
based on the comparing the entire output of the first OCR process to the entire output of the second OCR process, updating the plurality of initial threat assessment scores to a plurality of first threat assessment scores, wherein each image of the first subset of images is assigned its own first threat assessment score from the plurality of first threat assessment scores;
based on the first threat assessment score for at least one image of the first subset of images being greater than a threshold value, generating a first security alert; and
causing a user device to display the first security alert.

19. The non-transitory machine-readable medium of claim 18, wherein the operations further comprise:
executing a third OCR process on a second subset of images of the first plurality of images;
determining that the second subset of images do not depict text; and
assigning a second threat assessment score to each image of the second subset of images.

20. The non-transitory machine-readable medium of claim 18, wherein the first threat assessment score for the at least one image of the first subset of images is greater than the initial threat assessment score for the at least one image of the first subset of images, and wherein the updating the plurality of initial threat assessment scores includes automatically increasing the initial threat assessment score for the at least one image of the first subset of images to the first threat assessment score for the at least one image of the first subset of images based on the comparing.

* * * * *